(12) United States Patent
Aggarwal et al.

(10) Patent No.: US 9,094,196 B2
(45) Date of Patent: Jul. 28, 2015

(54) SYSTEM AND METHOD FOR FULL DUPLEX MAC DESIGNS BASED ON BACKOFF IN FREQUENCY DOMAIN

(75) Inventors: Vaneet Aggarwal, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 13/606,985

(22) Filed: Sep. 7, 2012

(65) Prior Publication Data

US 2014/0071865 A1    Mar. 13, 2014

(51) Int. Cl.
H04L 5/14    (2006.01)

(52) U.S. Cl.
CPC .............. *H04L 5/143* (2013.01); *H04L 5/1438* (2013.01)

(58) Field of Classification Search
None
See application file for complete search history.

(56) References Cited

U.S. PATENT DOCUMENTS

| | | | |
|---|---|---|---|
| 7,466,676 B2 * | 12/2008 | Gupta et al. | 370/329 |
| 8,472,467 B2 * | 6/2013 | Oyman et al. | 370/445 |
| 8,804,583 B2 | 8/2014 | Aggarwal et al. | |
| 8,842,584 B2 | 9/2014 | Jana et al. | |
| 2008/0112517 A1 | 5/2008 | Parts et al. | |
| 2011/0317633 A1 * | 12/2011 | Tan et al. | 370/329 |
| 2012/0147790 A1 | 6/2012 | Khojastepour et al. | |
| 2012/0155336 A1 | 6/2012 | Khojastepour et al. | |
| 2012/0201153 A1 | 8/2012 | Bharadia et al. | |
| 2013/0188760 A1 | 7/2013 | Subramanian et al. | |
| 2013/0215805 A1 | 8/2013 | Hong et al. | |
| 2013/0244720 A1 | 9/2013 | Hsia et al. | |
| 2013/0301487 A1 | 11/2013 | Khandani | |
| 2014/0010145 A1 * | 1/2014 | Liu et al. | 370/312 |
| 2014/0016515 A1 | 1/2014 | Jana et al. | |
| 2014/0078940 A1 | 3/2014 | Aggarwal et al. | |

OTHER PUBLICATIONS

Everett et al., "Empowering full-duplex wireless communication by exploiting directional diversity," Conference Record of the Forty Fifth Asilomar Conference on Signals, Systems and Computers (ASILOMAR), 2011, Nov. 6-9, 2011, pp. 2002-2006; ISBN: 978-1-4673-0321-7.

S. Sen, R. R. Choudhury, and S. Nelakuditi. CSMA/CN: Carrier Sense Multiple Access with Collision Notification. *In Proceedings of ACM Mobicom*, Illinois, USA, Aug. 2010, pp. 1-12.

A. Sahai and G. Patel and A. Sabharwal. Pushing the limits of Full-duplex: Design and Real-time implementation. In arXiv.org: 1107.0607, 2011, pp. 1-12.

S. Sen, R. R. Choudhury, and S. Nelakuditi. No time to Countdown: Migrating Backoff to the Frequency Domain. *In Proceedings of ACM Mobicom*, Nevada, USA, Sep. 2011, pp. 1-12.

(Continued)

*Primary Examiner* — Donald Mills

(57) ABSTRACT

Disclosed herein are a systems and method for using frequency tones to schedule full-duplex communications between at least two full-duplex communication nodes. Communication nodes having data to transmit send, as part of two contention rounds, two separate and randomly selected frequency tones. In the first contention round, all nodes having data to transmit simultaneously transmit a frequency tone. Based on these first frequency tones, groups of nodes are formed. Each group of nodes in turn transmits a second set of frequency tones, and a schedule of full-duplex communications is created based on the second frequency tones.

20 Claims, 6 Drawing Sheets

(56) References Cited

OTHER PUBLICATIONS

N. Singh and D. Gunawardena and A. Proutiere and B. Radunovia and H.V. Balan and P. Key. Efficient and Fair MAC for wireless networks with self-interference cancellation. In *Proceedings of WiOpt*, Princeton, NJ, 2011, pp. 1-8.

J. Choi and M. Jain and K. Srinivasan and P. Levis and S. Katti. Achieving Single Channel, Full Duplex Wireless Communication. In *Proceedings of the ACM Mobicom*, Illinois, USA, 2010. ACM New York, NY, USA, pp. 1-12.

M. Duarte, A. Sabharwal. Full-Duplex Wireless Communications Using Off-The-Shelf Radios: Feasibility and First Results. Forty-Fourth Asilomar Conference on Signals, Systems, and Computers, 2010, pp. 1-5.

M. Jain, J. Choi, T. Kim, D. Bharadia, K. Srinivasan, S. Seth, P. Levis, S. Katti and P. Sinha. Practical, Real-time, Full Duplex Wireless, In *Proceedings of the 17$^{th}$ Annual International Conference on Mobile Computing and Networking (Mobicom* 2011). pp. 1-12.

\* cited by examiner

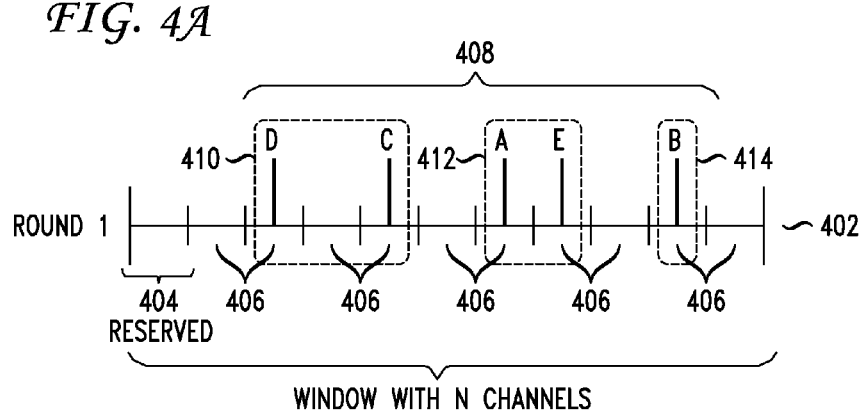
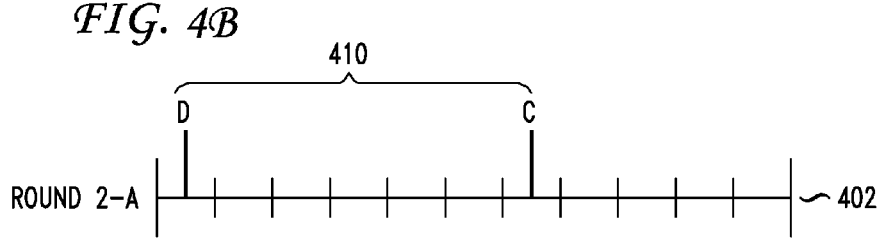
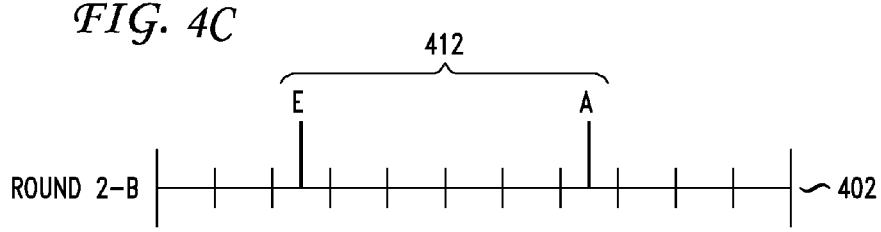

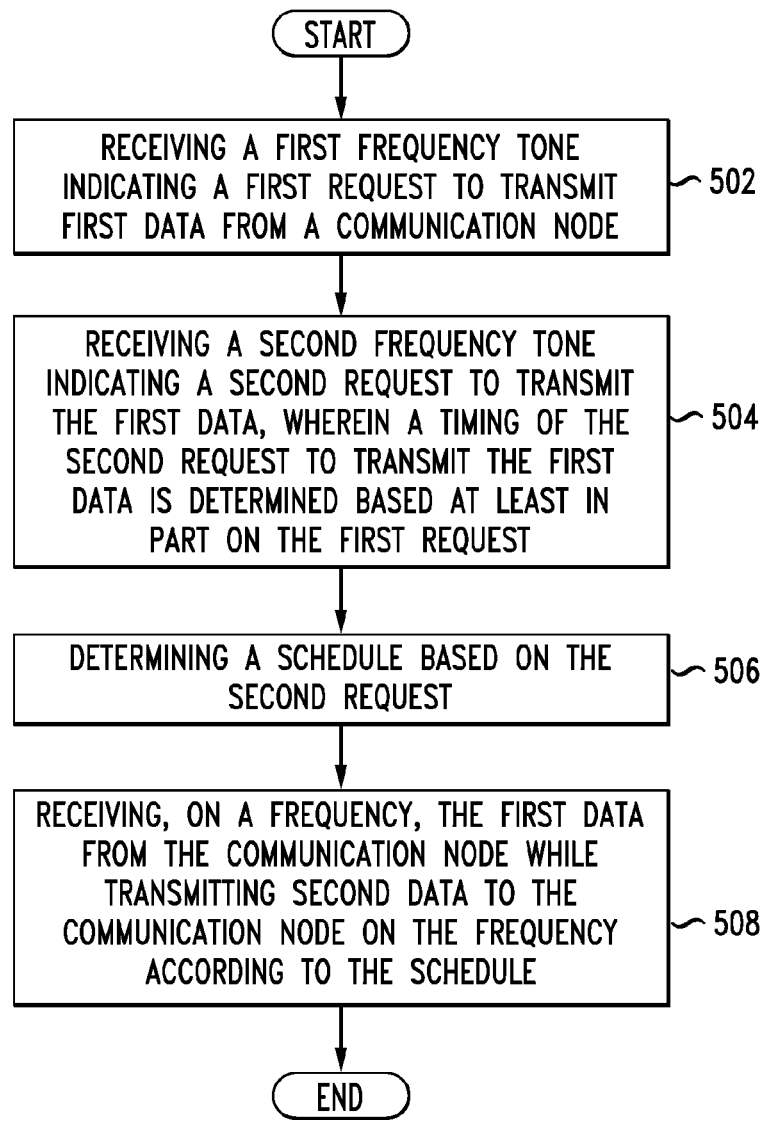

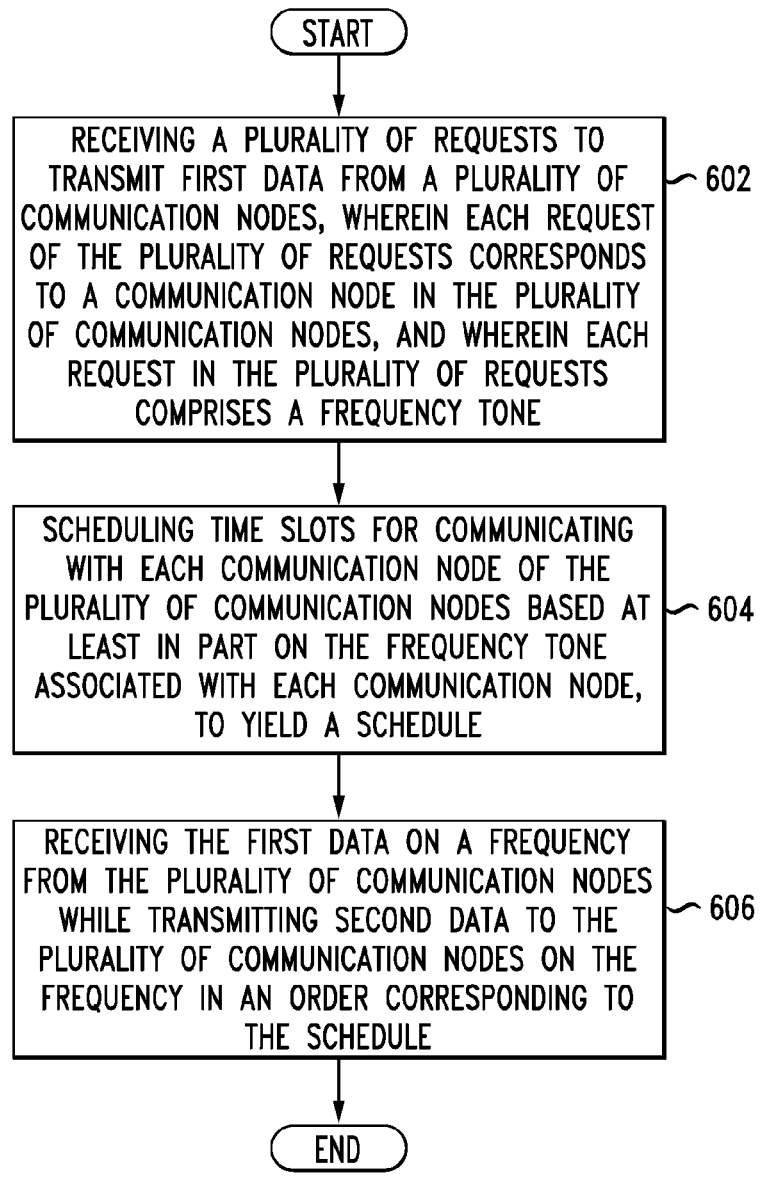

SYSTEM AND METHOD FOR FULL DUPLEX MAC DESIGNS BASED ON BACKOFF IN FREQUENCY DOMAIN

BACKGROUND

1. Technical Field

The present disclosure relates to full-duplex MAC designs and more specifically to improving the scheduling for when each node will transmit and receive data in full-duplex.

2. Introduction

All network-capable computing devices have unique identifiers assigned to them at manufacture, enabling communications with other network-capable computing devices. These unique identifiers are called Media Access Control addresses and serve to identify the computing device when communicating with other computing devices, either wirelessly or via a wired connection. With wired connections, transmit and receive signals are kept separate by using separate pins and wires for transmitting and receiving communications. However when the computing device communicates wirelessly specific protocols ensure that both the transmitting device and the receiving device are effectively engaged. These protocols rely upon the Media Access Control addresses of individual computing devices while affecting the Media Access Control sub-layer of the Open System Interconnection (OSI) model. Because these protocols effectively control all incoming and outgoing communications, the protocols for managing communications are themselves simply referred to as the MAC.

The MAC is responsible for arbitrating the frequency channel between different computing devices, or nodes, communicating in a network. The MAC utilizes a scheduler which determines which nodes have information to communicate and when each of those nodes will communicate with one another. While various versions of MAC scheduling exist, these previous MAC versions were not designed for scheduling full-duplex communications, where both the first communication node and the second communication node are transmitting and receiving on a single channel simultaneously.

BRIEF DESCRIPTION OF THE DRAWINGS

FIGS. 4A-4D illustrate a second embodiment of exemplary rounds of frequency tone communications in the frequency domain;

FIG. 5 illustrates a first example method embodiment; and

FIG. 6 illustrates a second example method embodiment.

DETAILED DESCRIPTION

Figure 1:
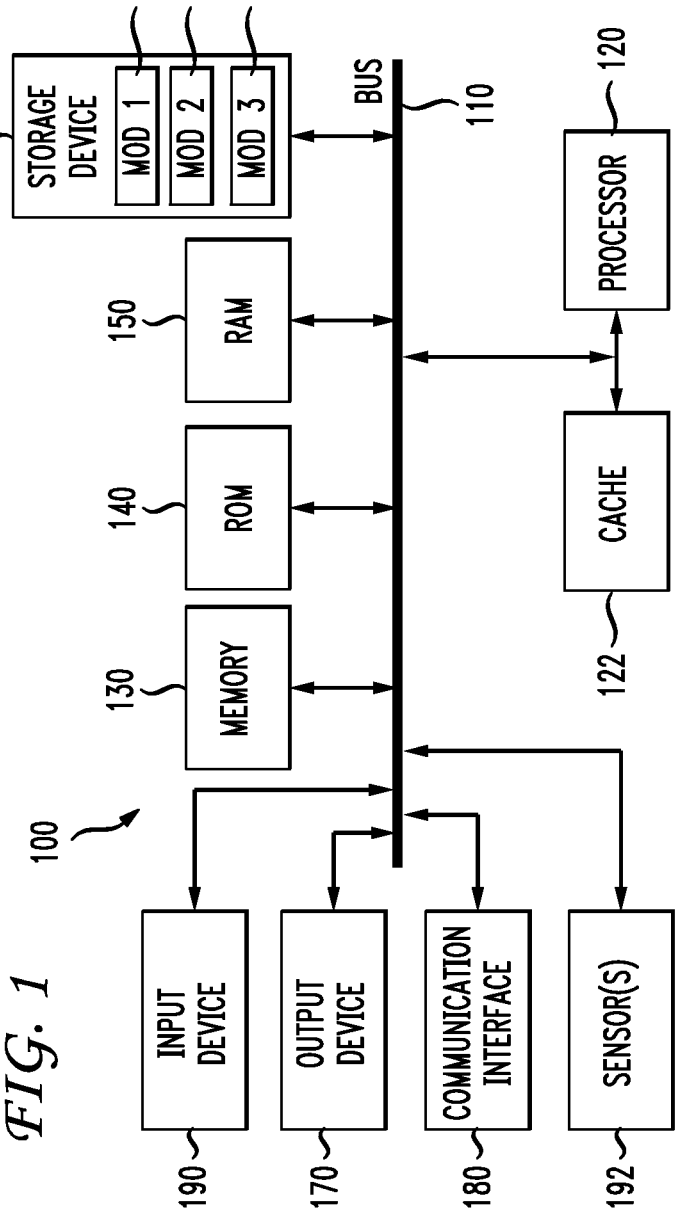
FIG. 1 illustrates an example system embodiment.

A system, method and computer-readable media are disclosed which provide improved scheduling of wireless communications. In particular, systems configured according to this disclosure can coordinate and arbitrate a schedule of communications between communication nodes which operate in full-duplex mode. The coordination in scheduling occurs because each node, in a network of nodes, which has data to transmit transmits frequency tones simultaneously with one another. Based on these frequency tones, the nodes are grouped and send a second round of frequency tones in those groups. From this second round of frequency tones a schedule is created, and the nodes transmit and receive data in full-duplex according to the schedule. This arbitration can occur either as part of the Media Access Control protocols, also known as the MAC, can occur separately from but in association with the MAC, or can occur independently from the MAC. This improved scheduling disclosed herein can organize communications both with full-duplex and half-duplex clients, however certain features may only apply to full-duplex clients.

Consider a central communication node communicating with multiple other communication nodes and needing to create a schedule for when to transmit/receive, in full-duplex, from each node. Rather than scheduling the nodes based on the order in which the central communication node receives request-to-send (RTS) signals from each individual communication node, a system configured according to this disclosure can schedule the nodes based on frequency tones. A spectrum of frequencies, or multiple frequency spectrums, can be defined to receive tones from multiple nodes. These tones, or bursts, can have a random or predetermined frequency, as well as fixed or dynamic bandwidth, duration, amplitude, and modulation. Because multiple nodes can transmit the frequency tones simultaneously and in a relatively short time period, the central node can quickly determine which nodes have information needing transmission, allowing the central node to schedule when each node will communicate in full-duplex with the central node. Moreover, this can, in certain configurations, eliminate the need for the central node to communicate a clear-to-send (CTS) signal, and reduce and/or eliminate the entire RTS-CTS handshake period normally part of initiating communications.

As an example, consider a system configured to perform a method of receiving a request to transmit data from a communication node, where the request is associated with a frequency tone or is a frequency tone. The request can include data and an associated frequency tone. The system can then respond to the request by communicating to the communication node an indication of availability using a second frequency tone. The system and the communication node then transmit and receive data in a bi-directional manner on a common frequency, i.e., in full-duplex.

As another example, the system can receive not just a frequency tone from a single communication node, but receive frequency tones from multiple communication nodes simultaneously, or nearly simultaneously. Each of these frequency tones can have identical characteristics between nodes. The tones can also be different to distinguish the node which transmitted the tone. These characteristics, which can be similar or different, can include bandwidth, frequency, modulation, power, spectral density, etc. In addition, the communicating nodes select the center frequency of these tones prior to transmitting the tone, or the center frequency of each tone can be randomly selected by the individual communication nodes. If needed, the system can partition the nodes which have sent frequency tones into groups, then have the communication nodes of each group send additional random tones to create the schedule of when each communication node will transmit and receive full-duplex data. The partitioning of the communication nodes into groups and sending additional tones is an additional confirmation of which nodes are participating in the communication link while also reducing the possibility that two communicating nodes are mistaken for a single node.

For example, consider if nodes A, B, C, D, and E all broadcast frequency tones in a first scheduling round. Assume that the system cannot distinguish between signals B and C, either due to a low initial tone from C or because the frequency selected by B was also the frequency selected by C. The system establishes two groups: A and B/C, and D and E. Each group of nodes will then transmit a second tone, which can again be randomly selected and can be the same as or different than the previously transmitted frequency tone. In our example case, nodes A, B, and C each transmit a second randomly selected frequency, and in this instance all three nodes select distinct frequencies. The system recognizes all three nodes and places them into the schedule for communications based on an order of the frequencies. The second group of nodes D and E then each transmit a second random selected frequency, again on distinct frequencies, and the system schedules these nodes. With all the groups completed, the system concludes scheduling and begins full-duplex communications based on the schedule communicated. Because each round of scheduling helps arrange the order of communication nodes with respect to one another, these rounds are also referred to as contention rounds.

Systems configured according to this disclosure can have a specific frequency band or frequency spectrum established in which to broadcast and receive frequency tones for the purpose of scheduling. This frequency spectrum can be contiguous or non-contiguous. In addition, this frequency spectrum can be the same as or different from the frequency spectrum associated with data transmitted in full-duplex. In certain configurations, specific frequency bands of the spectrum can be set aside during scheduling rounds as reserved and not used, or alternatively, not used in the initial scheduling round but used in later rounds.

When partitioning the nodes into groups after the initial contention round, the system can partition based on the number of tones (i.e., nodes) initially calculated to be in each group. Alternatively, the system can partition the nodes based on specific frequency bands within the provided frequency spectrum. Yet other configurations can define groups based both on the number of nodes in a given group and specific frequency bands.

As disclosed herein, communication nodes are computing devices capable of communicating with other enabled communication nodes. For example, in a wired network, each computer, router, server, etc. represents an individual communication node. Computing devices which utilize wireless networks can include desktop computers, laptops, smartphones, tablets, and other electronic devices capable of communicating in a wireless local area network. For example, if a device can communicate with other devices using IEEE communication standards, such as IEEE standard 802.11, that device is a communication node. In addition, non-network communication nodes such as walkie-talkies and amateur radios can also implement the disclosed principles to allow for full-duplex communications with other non-network communication nodes. Each node contains a transmitter, a receiver, both a transmitter and a receiver, or multiple transmitters and/or receivers.

Various embodiments of the disclosure are described in detail below. While specific implementations are described, it should be understood that this is done for illustration purposes only. Other components and configurations may be used without parting from the spirit and scope of the disclosure. We begin by describing three specific embodiments or configurations.

In a first configuration, multiple communication nodes desire to communicate with a single node (A) via full-duplex communications. Node A determines a schedule, or order, for communicating with each of these multiple nodes via two contention rounds in which each node transmits a frequency tone. In the first contention round, each node that has something to transmit sends a tone in a random frequency within a designated frequency spectrum. Each node that transmits in the smallest "K" bands goes to a second round, in which they again send tones in a new chosen frequency. Based on the frequency tones sent in the second round, a schedule for communications is established. Each node then communicates with node A in full-duplex in the order of the schedule.

In certain variations of this configuration, it may be necessary for the individual nodes to wait to begin full-duplex communications until after the node has decoded the header associated with the data and identifies that the data packet is addressed to itself. Thus, if a node is part of the contention queue, and that node gets a chance to send its data as part of a full-duplex communication (i.e., successfully wins a slot in a contention round), and has nothing in queue to transmit when its that node's turn, it can then send a null or special packet which is only a header. This null packet transmission helps preserve the logic of backoff protocols.

The backoff protocols regulate the amount of time other nodes wait upon a communication ending. When a node (X) is waiting for another node (Y) to go first, node X waits for a backoff time after Y finishes transmitting, then X transmits when/if the medium is idle. In addition, in this configuration, nodes not part of an immediate communication link do not treat a full-duplex exchange between the nodes of the communication link as a collision.

When a new user or node joins the network of node A and the other nodes, that node listens to the two tone contention rounds, then waits for a number of packet/data transmissions equal to the number of tones transmitted in the second round. Then the new node enters the first contention round of the next communication cycle. Possible advantages of this configuration are a reduced backoff needed due to multiple, simultaneous frequency tone transmissions, rather than time-independent transmissions, which results in reduced time waste. This configuration then provides for full-duplex communications to occur based on the schedule in a distributed manner.

In a second configuration, node A is again communicating with multiple other communication nodes. Each node that has something to transmit sends a tone in a chosen random backoff frequency. The random backoff frequencies from which each node can select can be updated each round. However, in the first round of contention, a specific tone is considered reserved and is not used. Then, in the second contention round, each node transmitting in the smallest "K" bands again contends for placement in the schedule by sending new, randomly selected frequency tones. In this second contention round, all tones can be used, including the reserved or restricted band. As with the previously described configuration, a schedule for future full-duplex communications is created based on the tones received during this second contention round. However, in this configuration, if a node is part of the contention queue after both contention rounds and has its turn to communicate with node A in full-duplex but has nothing to communicate on that turn, the node does not transmit a null packet or header. Instead, the node transmits a tone on the reserved frequency band of contention round 1 and a tone in the same frequency the node randomly selected in contention round 2. These tones can be transmitted at the same time, and provide a confirmation that this particular node is done transmitting with no data to send. In a slight variation, the node could send these two tones as a confirmation of transmission after sending data, indicating that the node is done communicating in this cycle of full-duplex communications.

In this second configuration, if a node A is waiting for another node B to go first, node A waits for a designated backoff time, then transmits when the medium is idle. When a new user/node joins the network of node A and the other communication nodes, that node listens for the two contention rounds, then waits for packets equal to the number of tones of the second round, then enters the following communication cycle, beginning with contention round 1.

Using this second configuration in an Access Point (AP) based scenario, all transmissions are between the AP node and various station nodes (STA), with no inter-STA packets. If the AP node needs to transmit data, it too can contend in the contention rounds with the STA nodes. In this situation, there is no need for nodes to transmit the null tones if the AP node is the last node to transmit/communicate and the AP node has no remaining data. Instead, the AP and STA nodes can send tone and/or a null packet to indicate termination of the communication cycle, initiate a backoff time period, and initiate a new cycle of communications. To facilitate the AP node being the last node in the schedule, a variation of this configuration can have the AP node always go last.

In a third configuration, as with the previous configuration, each node with data to transmit participates in two contention rounds to determine a transmission schedule. In the first contention round, each node transmits a tone in a randomly selected frequency, reserving the lowest frequency band. Instead of the lowest frequency band, other variations can place this reserved frequency band, channel, or slot elsewhere in the provided frequency spectrum. In the second contention round, the communicating nodes are grouped into bands. Those nodes which transmitted signals in the smallest "K" bands transmit a second set of tones in newly selected random frequencies. The reserved band, however, is still reserved in round 2. In this configuration, prior to sending data when the turn begins, the sender node first sends a Request-to-Send (RTS) signal. If the receiver node has full-duplex data for the sender node, and if the receiver node participated in the second contention round, the receiver node sends a Clear-to-Send (CTS) signal on the reserved frequency band and a tone in the same band the receiver node used in contention round 2. If the receiver node has full-duplex data for the sender node but did not participate in the second contention round, the receiver node sends a tone in the sender node's second round frequency. Other nodes listen to this tone and remove it from the schedule, ensuring that this sender node does not transmit again in the communication cycle. This configuration aids where the packet source detection for full-duplex cannot be accomplished without full packet transmission, and therefore a RTS is needed to know the source before being able to send data to the receiver node. This configuration can also aid in notifying nodes not part of the immediate communication link of reduced rates arising from full-duplex transmissions.

A brief introductory description of a basic general purpose system or computing device in FIG. 1 which can be employed to practice the concepts and configurations is disclosed herein. Additional description of scheduling for full-duplex capable communication nodes using frequency tones will then follow, using multiple variations and configurations. These variations shall be described herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120.

The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2A:
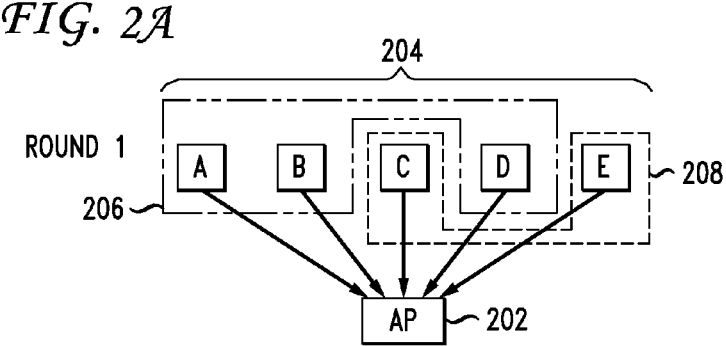
FIGS. 2A-2C illustrate exemplary contention rounds of frequency tone communications between communication nodes and an Access Point communication node.
Figure 2B:
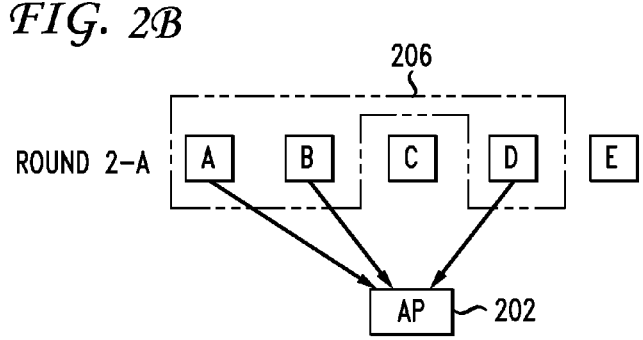
Figure 2C:
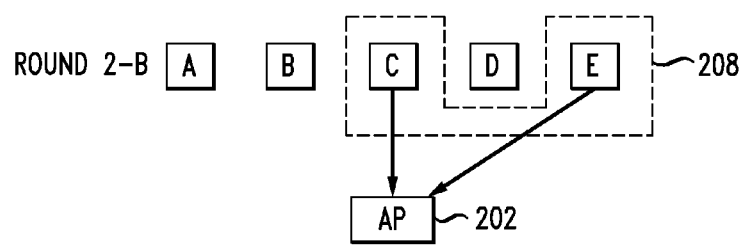

Having disclosed some components of a computing system, the disclosure now turns to FIGS. 2A-2C, which illustrate exemplary contention rounds of frequency tone communications between communication nodes 204 and an Access Point (AP) communication node 202. As illustrated, the AP node 202 can be a specific form of central node, such as a router, through which the other nodes 204 connect to a larger network. Alternative, the AP node 202 can be considered to be a node communicating with a plurality of other nodes but not as a central node. For example, the AP node 202 could represent a single smartphone communicating directly with other smartphones via full-duplex communications in a network of smartphones.

FIG. 2A illustrates the first contention round. This round can follow a network wide back-off time after previous full-duplex communications cease. MAC designs use a Distributed Coordination Function (DCF) which requires nodes wishing to transmit data to listen for a specified interval, or back-off time, after each cycle of communications. This back-off time, also referred to as the DCF Interframe Space, or DIFS, allows each node to know that a new cycle of scheduling and communications is about to begin. In the first contention round illustrated, multiple communication nodes 204 are communicating with the AP node 202. Each communication node 204 transmits a frequency tone signal indicating that the communication node has information to exchange with the AP node 202. This frequency tone is randomly selected within a provided frequency spectrum. As illustrated, only the AP node receives these frequency tones, however in other configurations the other nodes 204 could also receive and process the frequency tone signals. Having received the tones, the AP node 202 partitions the tones received from the other nodes 204 into groups 210, 212. In the illustration, the nodes 204 are divided into 2 groups, however in other network configurations/situations, more groups can be established. The number of groups can be based on the number of tones detected, the memory and processing capabilities of the AP node 202, or time constraints. The nodes partitioned into these groups will then, as groups, simultaneously transmit a second round of frequency tone signals in a second contention round, where the frequency tone signals are again randomly selected from the provided frequency spectrum.

FIGS. 2B and 2C each respectively illustrate a group 210, 212 organized in round 1 participating in the second contention round. Because each group transmitting a second set of frequency tones is only a portion of the contention round, FIG. 2B labels this round as round 2-A. In the second contention round, each group 210, 212 sequentially transmits second frequency tones. For example, FIG. 2B illustrates the communication nodes assigned to the first group 206 transmitting their second frequency tones as part of the second contention round. The AP node 202 receives the randomly selected frequency tones of the first group 206 and creates an ordered schedule based on this second round of randomly selected frequency tones. The AP node 202 will later use this ordered schedule when engaging in full-duplex communications.

It is noted that nodes A, B, and D 206 were selected as the first group. Because the AP node 202 only receives randomly selected frequency tones from the nodes 204, the nodes 204 are essentially anonymous. This prevents communication node favoritism, which can come about due to physical location, signal strength, or node identification order (such as A, B, C, etc.). In addition, the manner in which the AP node 202 selects the groups can change over time, such that the owners/manufacturers of the other communication nodes 204 will be impeded in exploiting any specific grouping mechanism. For example, during the first cycle of communications, the AP node 202 can select as the first group those nodes that have the lowest five center frequencies in the frequency spectrum. During the second cycle the AP node can then select as the first group those nodes that have a highest five center frequencies in the frequency spectrum. Similar shifts can occur randomly throughout the communication cycles, or can occur based on extraneous input.

Having determined the order of the first group 206 based on the second set of random frequency tones illustrated in FIG. 2B, the AP node 202 determines the order of the second group 208, as illustrated in FIG. 2C, again as part of the second contention round. As with the first group 206, the nodes of the second group 208, nodes C and E 208, transmit random frequency tones. FIG. 2C labels this portion of the second contention round as round 2-B. The AP node 202 places these nodes in the schedule after the nodes of the first group 206, where the order in the schedule of the nodes belonging to the second group is based on an ordering algorithm of the AP node 202.

After determining the order of the second group of communication nodes in the schedule the second contention round ends. The AP node 202 can then begin full-duplex communications with each of the communications nodes in the order determined by the contention rounds. Upon completing all of the planned communications, the nodes 202, 204 wait a designated amount of time, (i.e., the DIFS) before initiating the next cycle of frequency tones, scheduling, and full-duplex communications.

When a new node joins this network of nodes (the AP node 202 and the other nodes 204) during either the scheduling or the full-duplex communications, the new node first listens to the first and second contention rounds. During the second contention round, the new node notes the total number of distinct frequency tones broadcast. Then, during the full-duplex data transmissions, the new node waits until the number of full-duplex transmissions is equal to the number of frequency tones counted the second round. At that point the new node is confident (i.e., has a threshold level of certainty) that the previous cycle of communications has ended and that a new contention round is beginning. The new node can then contend with the other nodes in the network for a location in the schedule by participating in the first and second contention rounds. In addition, it is noted that while FIGS. 2A-2C illustrate only five nodes 204, more or fewer nodes are within the scope of this disclosure. Moreover, the number of groups of nodes determined can be greater than two, or, in certain instances, there can be a single group. Finally, various configurations can employ additional contention rounds or a single contention round to determine the order of the communication nodes.

Figure 3A:
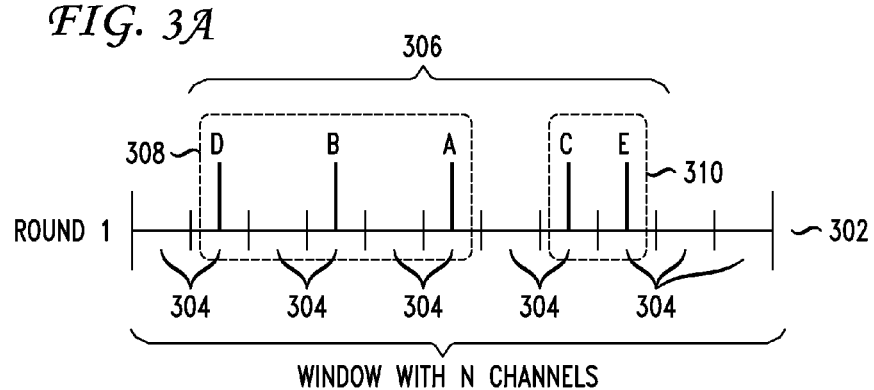
FIGS. 3A-3C illustrate exemplary contention rounds of frequency tone communications in the frequency domain.
Figure 3B:
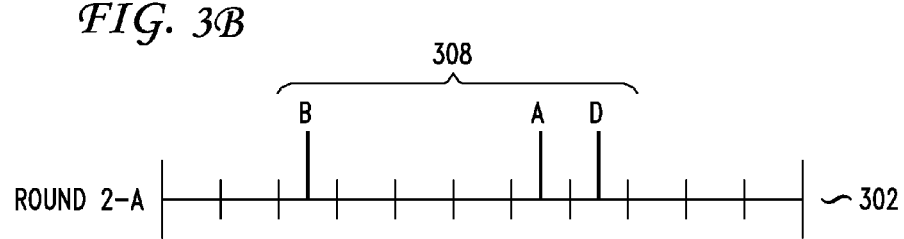
Figure 3C:
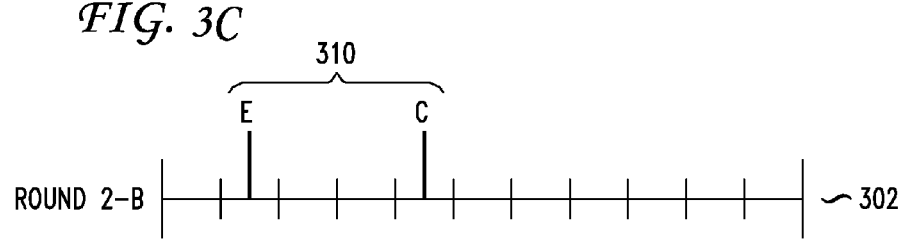

FIGS. 3A-3C illustrate two exemplary contention rounds of frequency tone communications in the frequency domain. Whereas FIGS. 2A-2C illustrate these contention rounds from a communication node/hardware perspective, FIGS. 3A-3C illustrate these same contention rounds from a frequency perspective. The signals 306 are marked with letters corresponding to the nodes 204 of FIGS. 2A-2C which transmitted the signals 306. During the first contention round (Round 1) illustrated in FIG. 3A, multiple communication nodes A, B, C, D, and E 204 transmit frequency tones 306 in a frequency spectrum 302 or window. This spectrum 302 can be divided into N bands 304, or channels, of a predefined bandwidth. As illustrated, each communication node 204 randomly selects a frequency band 304 in which to indicate to the AP node 202 that the node has information to communicate.

The AP node 202, upon receiving the frequency tone signals 306, organizes the tones received into groups 308, 310. In this example, the two groups of signals 308, 310 are organized based on the order of the signals 306 within the spectrum 302. The three lower frequency signals D, B, and A, are organized into a first group 308, and the two higher frequency C and E are organized into a second group 310. Having received frequency tone signals 306 from all of the communication nodes 204 which have data to transmit, and having organized the signals 306 into groups 308, 310, the first contention round ends.

During the second contention round, illustrated in FIGS. 3B and 3C, each group 308, 310 sends a second round of frequency tones. For example, in FIG. 3B, each node in the first group 308 sends a new frequency tone. This new frequency tone can be randomly generated or predetermined by each node. Based these second, newer frequency tones, a schedule is determined for the AP node 202 to communicate with the nodes 206 having signals in the first group 308 of signals. The AP node 202 can use signal qualities such as the bandwidth, center frequency, amplitude, or other factors to analyze the first group signals 308 and determine this schedule. Having determined the schedule for communications with the first group 308, the second group begins the second contention round. As illustrated in FIG. 3C, each node 208 associated with the second group 310 of signals sends a new frequency tone, which can similarly be generated or predetermined by each node. Using these frequency tones, the AP node 202 determines the schedule for communicating with the nodes 208 associated with the second group 310 of signals. The nodes 202, 204 then transmit/receive data in full-duplex according to the schedule created, wait for the period of time designated by the DIFS, and begin a new cycle of contention rounds and full-duplex communication.

FIGS. 4A-4D similarly illustrate exemplary contention rounds of frequency tone communications in the frequency domain. However, unlike FIGS. 3A-3C, FIGS. 4A-4C illustrate contention rounds in which a specified band of the frequency spectrum 402 is restricted or protected in the first round. As illustrated, this reserved or restricted band 404 is the lowest frequency band of the various frequency bands 404, 406 in the allocated frequency spectrum 402. Other configurations could have the restricted band 404 as the highest frequency band of the spectrum 402, could have multiple restricted frequency bands frequency bands throughout the spectrum 402 in contiguous or non-contiguous configurations. For example, a system could have three restricted bands, one in the middle of the spectrum 402 and two contiguous bands at the higher end of the spectrum 402.

In FIG. 4A, multiple communication nodes again communicate, as part of the first contention round in a cycle of full-duplex communications, communications frequency tones 408 corresponding to the bands 406. However, none of the communication nodes select the reserved band 404 during this first round of communications. The system again groups the received signals 408 into groups 410, 412, and 414. In the illustrated example, each group has at most 2 signals, resulting in groups of D and C 410, A and E 412, and B 414. This ends the first contention round.

During the second contention round, the system has each of the nodes associated with the signals 408 again transmit randomly selected frequency tones from within the designated frequency spectrum 402, only in this instance rather than all nodes transmitting simultaneously, they transmit the new frequency tones based on the groups 410, 412, 414 organized in contention round 1. In FIG. 4B, the first group begins contention round two (Round 2A), with both nodes D and C of the first group of signals 410 transmitting new randomly selected frequency tones. In this configuration, the restricted band 404 from round 1 is no longer restricted, as illustrated by communication node D randomly selecting this band for its frequency tone. The system creates a schedule for communicating in full-duplex with nodes D and C based on these new, additional randomly selected frequency tones.

The system then repeats this process in FIGS. 4C and 4D with the remaining groups 412, 414. The third group 414, which only contains the signal associated with communication node B, performs the same frequency tone contention round as the previous groups 410, 412, in part because if there were another signal which was masked by the first round signal of node B, the hidden node's signal would appear in this step. Having determined a schedule of the communication nodes based on their respective frequency tones in the first and second contention rounds, the system then begins to perform full-duplex communications in an order based on that schedule.

Having disclosed some basic system components and concepts, the disclosure now turns to the exemplary method embodiments shown in FIGS. 5 and 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

In the first exemplary method of FIG. 5, a system 100 receives a first frequency tone indicating a first request to transmit first data from a communication node (502). Receiving this first request can be part of a first contention round, with multiple other nodes, or the communication node can be the only node communicating with the system 100. The frequency tone can be single, contiguous tone, or can be multiple non-contiguous signals across a designated frequency spectrum. Within this spectrum, one or more frequency bands can be designated as restricted or reserved, where again the reserved frequency bands can be contiguous or non-contiguous. The frequency tone transmitted by the communication node can be randomly selected, or can be selected based on circumstances or variables associated with the node, relative positioning of the node and the system 100, usage in previous communication cycles, or the amount of data needing to be transmitted. In addition, there can be multiple communication nodes attempting to communicate with the system 100, where each communication node sends its own first request.

The system then receives a second frequency tone indicating a second request to transmit the first data from the communication node, wherein a timing of the second request to transmit the first data is determined based at least in part on the first request (504). For example, if there are multiple communication nodes all transmitting request signals to the system 100, the system 100 can base the timing of the second request on groups or partitions of the multiple signals. This grouping or partitioning can be based on a received frequency, a signal duration, an amplitude, or a modulation scheme. The second request signal is again randomly selected frequencies within the allowed frequency spectrum, predetermined, or selected based on current circumstances, and the frequency of the second request does not need to match the frequency of the first request.

The system 100 then determines a schedule based on the second request (506) and receives, on a frequency, the first data from the communication node while transmitting the second data to the communication node on the frequency according to the schedule (508). In determining the schedule, the system 100 will often order the communication nodes based on the order of the second request frequency. For example, if nodes A, B, and C are grouped together and all three nodes send second requests, the system 100 can then determine the order of A, B, and C based on the frequency of those second requests. The system 100 then engages in full-duplex communications with nodes A, B, and C sequentially in the order of the schedule.

In the second exemplary method of FIG. 6, a system 100 receives a plurality of requests to transmit first data from a plurality of communication nodes, wherein each request of the plurality of requests corresponds to a communication node in the plurality of communication nodes, and wherein each request in the plurality of requests comprises a frequency tone (602). These requests to transmit can be frequency tone transmissions, where a tone is transmitted with or without associated data. The system 100 then schedules time slots for communicating with each communication node of the plurality of communication nodes based at least in part on the frequency tone associated with each communication node, to yield a schedule (604). This schedule indicates the order in which the system 100 will communicate with each of the plurality of nodes in full-duplex. Having made the schedule, the system 100 receives the first data on a frequency from the plurality of communication nodes while transmitting second data to the plurality of communication nodes on the frequency in an order corresponding to the schedule (606). After performing full-duplex communications with each node in the plurality of nodes, the system 100 and the plurality of nodes wait a predetermined back-off period, then begin a new cycle of transmitting first requests and second requests.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to full-duplex enabled systems communicating with other full-duplex systems or with half-duplex systems. Various modifications and changes may be made to the principles described herein without following the example embodiments and applications illustrated and described herein, and without departing from the spirit and scope of the disclosure.

We claim:

1. A method comprising:
receiving a first frequency tone indicating a first request to transmit first data from a communication node;
receiving a second frequency tone indicating a second request to transmit the first data from the communication node, wherein a timing of the second request to transmit the first data is determined based on the first request;
determining a schedule based on the second request; and
receiving, on a frequency channel, the first data from the communication node while transmitting, in full duplex, second data to the communication node on the frequency channel according to the schedule.

2. The method of claim 1, wherein the first frequency tone and the second frequency tone are randomly selected.

3. The method of claim 1, wherein the first frequency tone and the second frequency tone are not identical.

4. The method of claim 1, further comprising:
waiting, after receiving the first data while transmitting the second data, a pre-determined amount of time; and
upon waiting the pre-determined amount of time, reinitiating the method.

5. The method of claim 1, wherein:
the first frequency tone is received during a first contention round comprising a restricted frequency band in a frequency spectrum; and
the second frequency tone is received during a second contention round.

6. The method of claim 1, wherein the first data comprises only a header when the communication node no longer needs to transmit the first data.

7. The method of claim 1, wherein the frequency channel is in a same frequency spectrum as the first frequency tone and the second frequency tone.

8. The method of claim 1, wherein the frequency channel is in a different frequency spectrum as the first frequency tone and the second frequency tone.

9. A system comprising:
a processor; and
a computer-readable storage medium having instructions stored which, when executed by the processor, cause the processor to perform operations comprising:
receiving a first frequency tone indicating a first request to transmit first data from a communication node;
receiving a second frequency tone indicating a second request to transmit the first data from the communication node, wherein a timing of the second request to transmit the first data is determined based on the first request;
determining a schedule based on the second request; and
receiving, on a frequency channel, the first data from the communication node while transmitting, in full-duplex, second data to the communication node on the frequency channel according to the schedule.

10. The system of claim 9, wherein the first frequency tone and the second frequency tone are randomly selected.

11. The system of claim 9, wherein the first frequency tone and the second frequency tone are not identical.

12. The system of claim 9, the computer-readable storage medium having additional instructions stored which, when executed by the processor, result in operations comprising:
waiting, after receiving the first data while transmitting the second data, a pre-determined amount of time; and
upon waiting the pre-determined amount of time, reinitiating the method.

13. The system of claim 9, wherein:
the first frequency tone is received during a first contention round comprising a restricted frequency band in a frequency spectrum; and
the second frequency tone is received during a second contention round.

14. The system of claim 9, wherein the first data comprises only a header when the communication node no longer needs to transmit the first data.

15. The system of claim 9, wherein the frequency channel is in a same frequency spectrum as the first frequency tone and the second frequency tone.

16. The system of claim 9, wherein the frequency channel is in a different frequency spectrum as the first frequency tone and the second frequency tone.

17. A computer-readable storage device having instructions stored which, when executed by a computing device, cause the computing device to perform operations comprising:
receiving a first frequency tone indicating a first request to transmit first data from a communication node;
receiving a second frequency tone indicating a second request to transmit the first data from the communication node, wherein a timing of the second request to transmit the first data is determined based on the first request;
determining a schedule based on the second request; and
receiving, on a frequency channel, the first data from the communication node while transmitting, in full-duplex, second data to the communication node on the frequency channel according to the schedule.

18. The computer-readable storage device of claim 17, wherein the first frequency tone and the second frequency tone are randomly selected.

19. The computer-readable storage device of claim 17, wherein the first frequency tone and the second frequency tone are not identical.

20. The computer-readable storage device of claim 17, having additional instructions which, when executed by the computing device result in operations comprising:
waiting, after receiving the first data while transmitting the second data, a pre-determined amount of time; and
upon waiting the pre-determined amount of time, reinitiating the operations.

* * * * *